(12) United States Patent
Knoell et al.

(10) Patent No.: US 12,320,411 B2
(45) Date of Patent: Jun. 3, 2025

(54) ELECTROMECHANICAL LINEAR ACTUATOR WITH HOLLOW SHAFT MOTOR

(71) Applicant: Robert Bosch GmbH, Stuttgart (DE)

(72) Inventors: Reiner Knoell, Burgsinn (DE); Marco Knoell, Burgsinn (DE); Michael Goldbach, Lohr A. Main (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/346,211

(22) Filed: Jul. 1, 2023

(65) Prior Publication Data
US 2024/0011544 A1 Jan. 11, 2024

(30) Foreign Application Priority Data
Jul. 6, 2022 (DE) ...................... 10 2022 206 871.8

(51) Int. Cl.
*F16H 25/24* (2006.01)
*F16H 25/20* (2006.01)
*F16H 25/22* (2006.01)

(52) U.S. Cl.
CPC . *F16H 25/2454* (2013.01); *F16H 2025/2031* (2013.01); *F16H 2025/2075* (2013.01); *F16H 2025/2078* (2013.01); *F16H 25/2252* (2013.01)

(58) Field of Classification Search
CPC ............. F16H 25/2454; F16H 25/2252; F16H 2025/2078; F16H 2025/2075
See application file for complete search history.

(56) References Cited

U.S. PATENT DOCUMENTS

| | | | | |
|---|---|---|---|---|
| 7,541,707 B2* | 6/2009 | Hochhalter | ............ | H02K 11/21 310/80 |
| 9,479,026 B2* | 10/2016 | Rapp | ...................... | H02K 11/21 |
| 9,548,637 B2* | 1/2017 | Rapp | ...................... | H02K 7/102 |
| 9,941,767 B2* | 4/2018 | Tamai | ...................... | H02K 5/10 |
| 10,125,851 B2* | 11/2018 | Schumann | .............. | F16H 25/20 |
| 11,754,157 B2* | 9/2023 | Keranen | ............. | F16H 25/2454 74/89.39 |
| 2006/0005645 A1* | 1/2006 | Zhou | ................... | F16H 25/2204 74/89.34 |
| 2006/0266146 A1 | 11/2006 | Waide | | |
| 2009/0260464 A1 | 10/2009 | Holker et al. | | |
| 2014/0300228 A1 | 10/2014 | Rapp et al. | | |
| 2021/0364070 A1* | 11/2021 | Keranen | ............. | F16H 25/2252 |

FOREIGN PATENT DOCUMENTS

| | | |
|---|---|---|
| CN | 102483142 A | 5/2012 |
| DE | 199 48 265 C2 | 10/2002 |
| DE | 43 00 512 B4 | 5/2007 |
| EP | 2 584 222 B1 | 2/2015 |
| EP | 2 854 222 B1 | 1/2020 |

\* cited by examiner

*Primary Examiner* — Gregory Robert Weber
(74) *Attorney, Agent, or Firm* — Maginot, Moore & Beck LLP

(57) ABSTRACT

An electromechanical linear actuator includes a threaded drive which has a threaded spindle and a threaded nut. The threaded spindle is coupled to a hollow shaft of an electric motor via a rotationally fixed connection. The threaded nut is fastened to a linearly movable extension tube. In a maximally retracted state of the extension tube, the threaded nut is retracted at least in portions, preferably completely, into the interior of the hollow shaft. During operation of the linear actuator, the threaded spindle rotates and is not moved linearly. The threaded nut does not rotate and is moved linearly.

14 Claims, 3 Drawing Sheets

A-A

ELECTROMECHANICAL LINEAR ACTUATOR WITH HOLLOW SHAFT MOTOR

This application claims priority under 35 U.S.C. § 119 to application no. DE 10 2022 206 871.8, filed on Jul. 6, 2022 in Germany, the disclosure of which is incorporated herein by reference in its entirety.

The present disclosure relates to an electromechanical linear actuator, which can also be referred to as an electric cylinder, and in which a rotational drive movement of an electric motor is converted by way of a threaded drive into a translational or linear output movement.

BACKGROUND

DE 199 48 265 C2 discloses such an electromechanical linear actuator, the electric motor of which is designed as a hollow shaft motor. Viewed in the axial direction, next to the electric motor, the threaded nut is fastened to the hollow shaft of said motor. The threaded nut thus rotates together with the hollow shaft, while the threaded spindle is moved only linearly and does not rotate. A disadvantage of such electromechanical linear actuators is that the axial installation space requirement of the stationary housing of the linear actuator is large due to the arrangement of the electric motor and threaded nut, which is adjacent viewed in the axial direction.

DE 43 00 512 B4 discloses two embodiments of an electromechanical linear actuator that is used as a fuel pump. In the two embodiments, a ball screw drive is used in each case. In the second embodiment, the motor shaft of the electric motor, which is made of solid material, is integrally formed with the threaded spindle, which, with a stationary sleeve serving as a threaded nut, forms the ball screw drive. The threaded spindle thus rotates and is moved linearly. In the first embodiment of DE 43 00 512 B4, in contrast, an electric motor is provided with a hollow shaft that at the same time forms the rotating threaded nut of the spindle drive. The threaded spindle is thus moved only linearly and does not rotate. Because the electric motor is arranged on the outer circumference of the threaded nut, the ratio between the retracted state and the extended state of the linear actuator is, in principle, maximized compared to that of the second embodiment and compared to that of DE 199 48 265 C2.

The patent specification EP 2 584 222 B1 shows the part of an electric cylinder that is designed for coupling to a separate, non-integrated electric motor. The threaded spindle rotates, but is not moved linearly. Instead, an extension tube is moved linearly. Compared to the linear actuators mentioned above, the linear actuator having the extension tube has the advantage that the threaded spindle, which is complex mechanically and to manufacture, is accommodated within the extension tube and is thus protected against dirt and mechanical damage.

The object of the present disclosure is to provide an electromechanical linear actuator in which the threaded spindle protected by the extension tube according to the principle of EP 2 584 222 B1 is combined with the maximized length ratio between the extended state and the retracted state of the first embodiment of DE 43 00 512 B4.

This object is achieved by an electromechanical linear actuator having the features set forth below.

Advantageous embodiments thereof are also set forth below.

SUMMARY

The electromechanical linear actuator of the present disclosure includes a threaded drive that has a threaded spindle and a threaded nut. The threaded spindle is coupled to a hollow shaft of an electric motor via a rotationally fixed connection (e.g. a positive-fit entrainment). The threaded nut is fastened to a linearly movable extension tube. In a (maximally) retracted state of the extension tube, the threaded nut is retracted at least in portions, preferably completely, into the interior of the hollow shaft, on the outer circumference of which the windings of the electric motor are situated. During operation of the linear actuator, the threaded spindle rotates and is not moved linearly. The threaded nut does not rotate and is moved linearly. The threaded nut effectively pushes the extension tube fastened thereto in the direction of the extended position or pulls the extension tube back into the retracted position. The threaded spindle is protected from dirt and mechanical damage by the extension tube. Since the threaded nut, in the retracted state, is enclosed by the hollow shaft and this in turn is enclosed by the windings of the electric motor, the axial installation space of the electric motor is used for the stroke of the linear actuator and the extension tube can be retracted further. This maximizes the ratio of the length of the linear actuator in the extended state to the length in the retracted state.

The thread drive can be a threaded roller screw drive or a ball screw drive or a planetary (roller) screw drive.

In the retracted state, the extension tube can be accommodated at least largely, preferably substantially, in a housing, e.g. in a first housing tube. The extension tube is then preferably guided in the housing by way of a plain bearing.

The housing preferably has a first housing tube and a second housing tube, wherein the first housing tube has a reduced diameter compared to the second housing tube. The electric motor is then arranged in the second housing tube, and the plain bearing is arranged on the inner circumference of an end portion of the first housing tube.

Since the threaded nut (in contrast to the first embodiment of DE 43 00 512 B4) is not driven, the heat retention and the service life can be improved by oil lubrication and by better sealing options. A sealing of the threaded nut is formed, for example, by the first housing tube.

The rotationally fixed connection is arranged on the end portion of the hollow shaft facing away from the extension tube, and, in the retracted state of the extension tube, adjacent to the threaded nut.

A spindle support, via which the threaded spindle is rotatably mounted in the extension tube, is preferably arranged on an end portion of the threaded spindle facing away from the rotationally fixed connection. The extension tube is also guided linearly along the end portion of the threaded spindle via the spindle support. The spindle end support may rotate with the end portion of the threaded spindle relative to the extension tube, or it may not rotate.

A holding brake, by way of which the threaded spindle can be fixed relative to the housing, can be arranged on the side of the rotationally fixed connection facing away from the hollow shaft.

A bearing, preferably a fixed bearing, preferably in the form of two tapered roller bearings or spherical roller bearings in an O-configuration, can be arranged on the side of the rotationally fixed connection facing away from the hollow shaft, by way of which bearing the threaded spindle is mounted in the housing. If the rotationally fixed connection is also mechanically fixed, i.e. if the hollow shaft and the threaded spindle are fastened to one another, this bearing is also used in a technically simple manner to support the hollow shaft.

An absolute rotary encoder is preferably arranged on the threaded spindle on the side of the rotationally fixed connection facing away from the hollow shaft. In this way, a determination of the position of the extension tube is possible without a path measuring system.

Preferably, on this side of the rotationally fixed connection facing away from the hollow shaft, adjacent to the rotationally fixed connection there is first the bearing, then the holding brake, and finally the absolute rotary encoder.

A (further) bearing, preferably a floating bearing, preferably a ball bearing or cylindrical roller bearing, by way of which the hollow shaft is supported in the housing, is preferably arranged on the outer circumference of the hollow shaft at an end portion of the hollow shaft facing away from the rotationally fixed connection. If the rotationally fixed connection is also mechanically fixed, i.e. if the hollow shaft and the threaded spindle are fastened to one another, this bearing is also used in a technically simple manner to support the threaded spindle.

In particular the electric motor and the threaded drive (threaded spindle and threaded nut) and the extension tube and the two bearings are preferably arranged coaxially. A laterally protruding electric motor and resulting imbalances or torques for the receptacles and bearings are thus prevented. Furthermore, it is advantageous if further components, for example the two housing tubes and/or the rotationally fixed connection and/or the spindle support and/or the plain bearing arranged between the extension tube and the housing tube and/or the holding brake are also coaxial. This prevents imbalances or torques for the receptacles and bearings.

DETAILED DESCRIPTION

An embodiment of the present disclosure is described below on the basis of the drawings.

Figure 1:
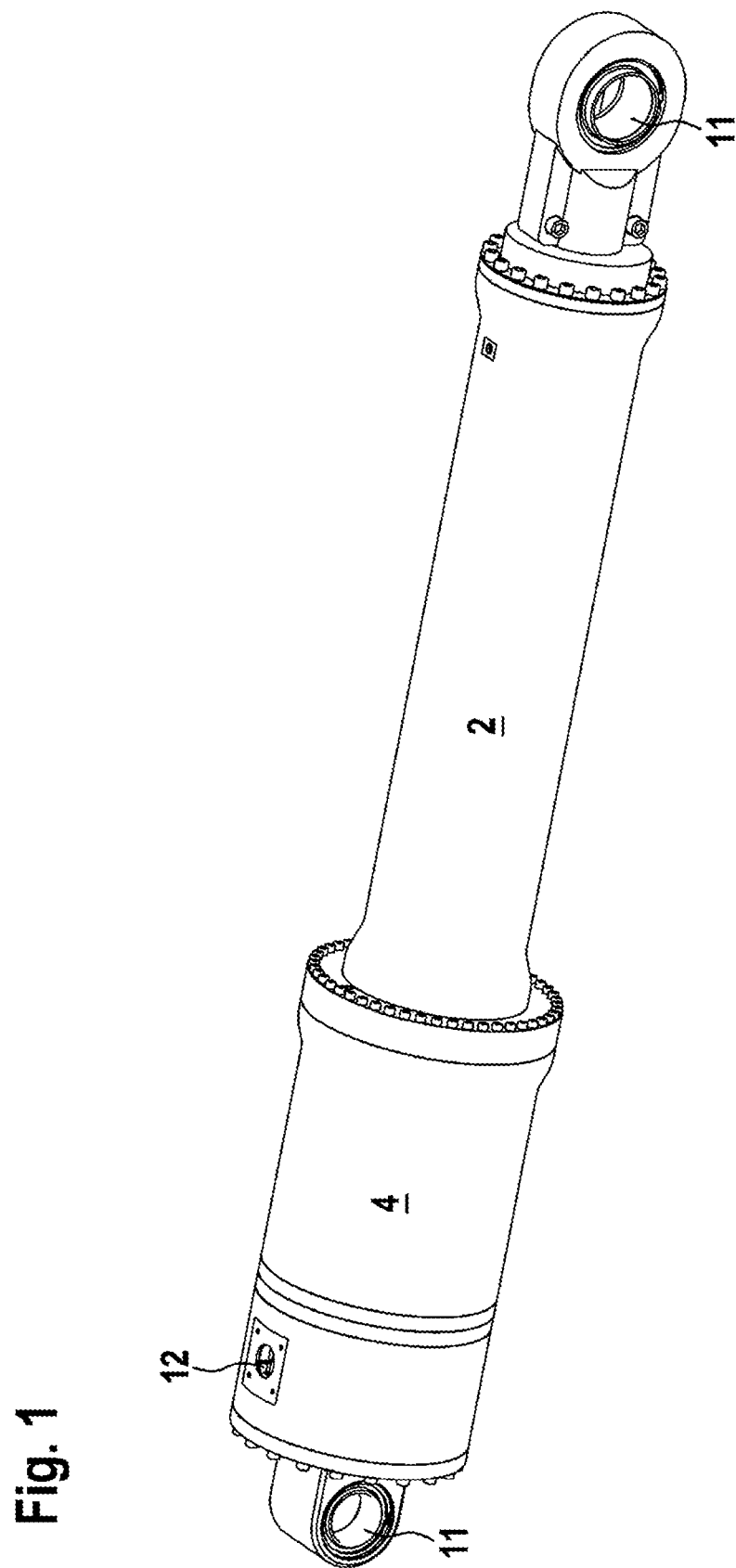
FIG. 1 is a view of a linear actuator according to an embodiment of the present disclosure in a retracted state of the extension tube thereof.

FIG. 1 shows the embodiment of the electromechanical linear actuator, which can also be referred to as an electric cylinder, in a perspective view. In the shown retracted state, a distance between two ball joints 11 is minimal. A housing fixedly connected to one of the two ball joints 11 (left-hand in FIG. 1) consists substantially of two housing tubes 2, 4 having different diameters. A further ball joint 11 (right-hand in FIG. 1) is linearly movable relative to the housing.

In relation to the second housing tube 4, the first housing tube 2 has a reduced diameter and an increased length. An electrical connection 12 is formed on the second housing tube 4.

Figure 2:
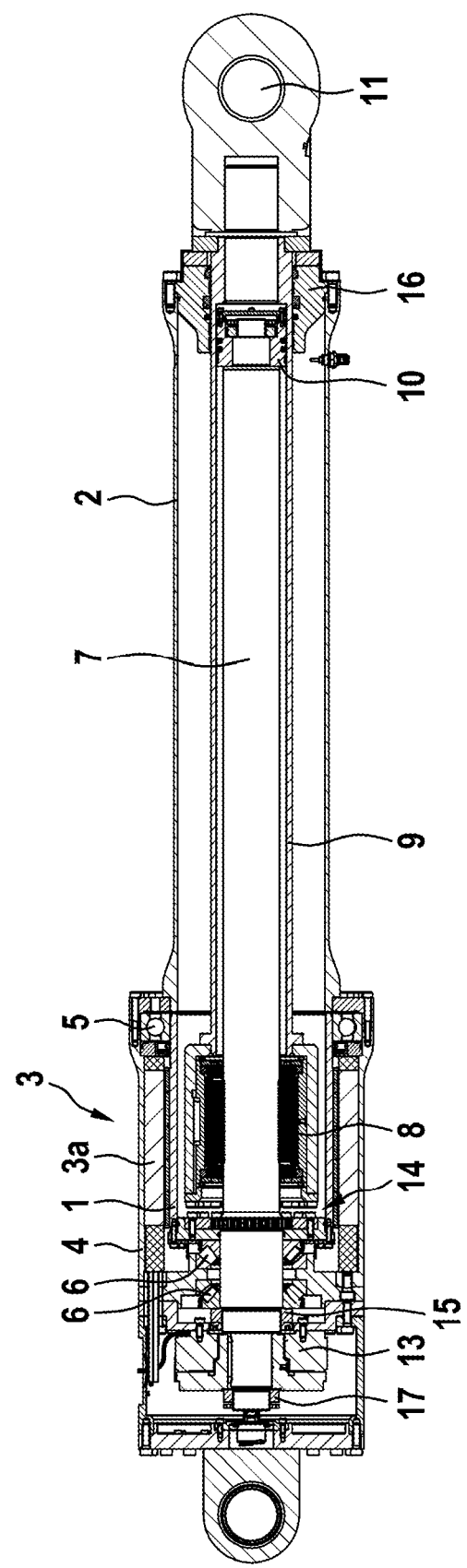
FIG. 2 is a sectional view of the embodiment of the linear actuator from FIG. 1.

FIG. 2 shows the embodiment of the linear actuator according to FIG. 1 in a sectional view. Numerous and essential components of the drive are arranged in the second housing tube 4, while an extension tube 9, and a threaded spindle 7 therein, are substantially arranged in the first housing tube 2. The extension tube 9, the rotation of which is prevented, is fixedly connected to one of the two ball joints 11 and can be extended from the first housing tube 2. The threaded spindle 7 rotates for this purpose and is not moved linearly. A spindle support 10 holds an end portion (right-hand in FIG. 2) of the threaded spindle 7 concentrically in the extension tube 9 and thus allows the rotation of the threaded spindle 7 in the extension tube 9 and the linear movement (working stroke) of the extension tube 9 relative to (the end portion of) the threaded spindle 7. The spindle support 10 can thus also be referred to as a sliding stroke bearing.

Furthermore, in order to allow the linear movement (the working stroke) of the extension tube 9 relative to the end portion of the stationary first housing tube 2, a plain bearing 16 is provided between these components.

Figure 3:
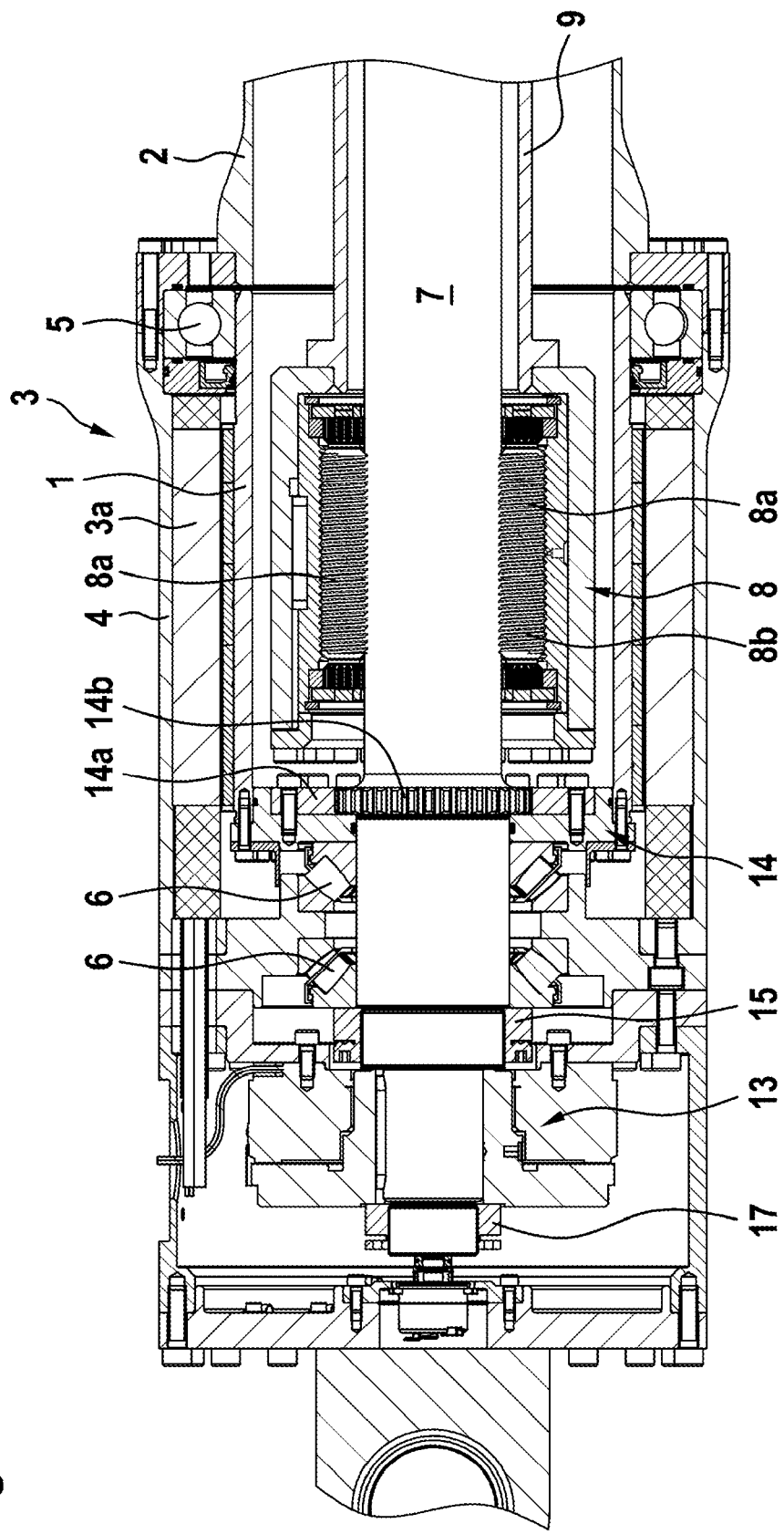
FIG. 3 is an enlarged detail of the sectional view from FIG. 2.

FIG. 3 shows the interior of the second housing tube 4 in an enlarged view. An electric motor 3 designed as a hollow shaft motor and a threaded drive designed as a planetary (roller) screw drive are arranged in the second housing tube 4. More precisely, viewed radially from the outside to the inside, first there are windings 3a of the electric motor 3, then a hollow shaft 1 of the electric motor 3, then a sleeve-like main body 8b of a threaded nut 8, then roller-shaped planets 8a of the threaded nut 8, and, furthest from the outside, the threaded spindle 7. A radial distance is provided between the hollow shaft 1 and the main body 8b of the threaded nut 8.

The main body 8b of the threaded nut 8 is fixedly connected to an end portion of the extension tube 9. The assembly consisting of the threaded nut 8 and the extension tube 9 and the ball joint 11 is movable only linearly.

The hollow shaft 1, at the end portion thereof facing away from the first housing tube 2, is connected to the threaded spindle 7 by way of a rotationally fixed connection 14. A positive-fit element 14a on the hollow shaft side and a positive-fit element 14b on the spindle side of the rotationally fixed connection 14 are designed and fastened to one another in such a way that the hollow shaft 1 and the rotationally fixed connection 14 and the threaded spindle 7 form a flexurally rigid rotatable assembly.

The bearing of the rotating assembly consisting of the threaded spindle 7, the rotationally fixed connection 14 and the hollow shaft 1 can be mounted in the housing using only two bearing points, due to the flexurally rigid design. For this purpose, in the embodiment shown, a floating bearing 5 arranged on the end portion of the hollow shaft 1 and a fixed bearing arranged on the threaded spindle 7 are provided. The fixed bearing is formed from two tapered roller bearings 6 in an O-configuration, which is clamped against the rotationally fixed connection 14 by way of a clamping nut 15.

A holding brake 13 is arranged adjacent to the clamping nut 15, by way of which brake the threaded spindle 7 and thus the entire drive can be fixed relative to the housing, more precisely relative to the second housing tube 4.

An absolute rotary encoder 17 is arranged adjacent to the holding brake 13, at the shaft end of the threaded spindle 7. Thus, a determination of the position of the extension tube 7 is possible without a path measuring system.

During operation of the embodiment shown, the holding brake 13 is released and the electric motor 3 is activated. The hollow shaft 1 of the electric motor entrains the threaded spindle 7. The planets 8a of the threaded nut 8 roll on the outer circumference of the threaded spindle 7 and move the rotationally fixed main body 8b and thus the extension tube 9 fastened thereto relative to the first housing tube 2 and thus relative to the housing.

Because the retracted position of the threaded nut 8 (shown in FIGS. 2 and 3) is arranged in the interior of the electric motor 3, the axial installation space requirement of these components is minimized. Thus, the ratio of the distance between the two ball joints 11 in the extended state to the distance between the two ball joints 11 in the retracted state (as shown in FIGS. 1 and 2) is maximized.

LIST OF REFERENCE SIGNS

1 Hollow shaft
2 First housing tube
3 Electric motor
4 Second housing tube
5 Floating bearing
6 Tapered roller bearing
7 Threaded spindle
8 Threaded nut
8a Planet
8b Main body
9 Extension tube
10 Spindle support
11 Ball joint
12 Electrical connection
13 Holding brake
14 Rotationally fixed connection
14a Positive-fit element on the hollow shaft side
14b Positive-fit element on the spindle side
15 Clamping nut
16 Plain bearing
17 Absolute rotary encoder

What is claimed is:

1. An electromechanical linear actuator, comprising:
an electric motor having a hollow shaft;
a linearly movable extension tube;
a housing; and
a threaded drive having a threaded spindle and a threaded nut,
wherein
the threaded spindle is coupled to the hollow shaft of the electric motor via a rotationally fixed connection,
the threaded nut is fastened to the linearly movable extension tube,
in a maximally retracted state of the linearly movable extension tube, the threaded nut is arranged at least partly in an interior of the hollow shaft,
the housing includes a first housing tube with a first longitudinal extent along an axis of the electromechanical linear actuator, and a second housing tube with a second longitudinal extent along the axis of the electromechanical linear actuator,
a bearing is arranged in the second housing tube on an outer circumference of the hollow shaft on an end portion of the hollow shaft facing away from the rotationally fixed connection,
the bearing is configured to mount the hollow shaft in the housing,
the electric motor is primarily arranged in the second housing tube, and
the first longitudinal extent is greater than the second longitudinal extent.

2. The electromechanical linear actuator according to claim 1, wherein the extension tube in the maximally retracted state is primarily accommodated in the first housing tube.

3. The electromechanical linear actuator according to claim 2, wherein an end portion of the extension tube facing away from the threaded nut is guided in the housing by way of a plain bearing.

4. The electromechanical linear actuator according to claim 3, wherein:
the plain bearing is arranged in or on the first housing tube, and
the first housing tube has a reduced diameter compared to the second housing tube.

5. The electromechanical linear actuator according to claim 1, wherein the threaded nut has oil lubrication and is sealed relative to the environment.

6. The electromechanical linear actuator according to claim 1, wherein the rotationally fixed connection is arranged (i) at an end portion of the hollow shaft, and (ii) in the maximally retracted state of the extension tube, adjacent to the threaded nut.

7. The electromechanical linear actuator according to claim 1, further comprising a spindle support arranged on an end portion of the threaded spindle facing away from the rotationally fixed connection, wherein:
the spindle support is configured to rotatably mount the threaded spindle in the extension tube, and
the extension tube is also guided linearly along the end portion of the threaded spindle via the spindle support.

8. The electromechanical linear actuator of claim 1, further comprising a holding brake arranged on a side of the rotationally fixed connection facing away from the hollow shaft,
wherein the holding brake is configured to fix the threaded spindle relative to the housing.

9. The electromechanical linear actuator according to claim 1, further comprising a bearing arranged on a side of the rotationally fixed connection facing away from the hollow shaft,
wherein the bearing is configured to mount the threaded spindle to the housing.

10. The electromechanical linear actuator according to claim 9, wherein the bearing is a fixed bearing.

11. The electromechanical linear actuator according to claim 1, further comprising a rotary encoder arranged on the threaded spindle on a side of the rotationally fixed connection facing away from the hollow shaft.

12. The electromechanical linear actuator according to claim 1, wherein the rotationally fixed connection includes a first positive-fit element on a hollow shaft side, and a second positive-fit element on a spindle side, of the rotationally fixed connection.

13. The electromechanical linear actuator according to claim 1, wherein:
in the maximally retracted state of the linearly movable extension tube, the threaded nut is arranged completely in the interior of the hollow shaft.

14. The electromechanical linear actuator according to claim 1, wherein the bearing is a floating bearing.

* * * * *